(12) United States Patent
Teraoka et al.

(10) Patent No.: US 11,501,924 B2
(45) Date of Patent: Nov. 15, 2022

(54) MULTILAYER CERAMIC CAPACITOR

(71) Applicant: Murata Manufacturing Co., Ltd., Nagaokakyo (JP)

(72) Inventors: Eiji Teraoka, Nagaokakyo (JP); Isao Fukuchi, Nagaokakyo (JP); Haruki Kobayashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/096,096

(22) Filed: Nov. 12, 2020

(65) Prior Publication Data
US 2021/0142947 A1 May 13, 2021

(30) Foreign Application Priority Data
Nov. 13, 2019 (JP) .............................. JP2019-205455

(51) Int. Cl.
| | |
|---|---|
| *H01G 4/008* | (2006.01) |
| *H01G 4/12* | (2006.01) |
| *H01G 4/30* | (2006.01) |
| *H01G 4/232* | (2006.01) |
| *H01G 4/248* | (2006.01) |

(52) U.S. Cl.
CPC .............. *H01G 4/30* (2013.01); *H01G 4/008* (2013.01); *H01G 4/1227* (2013.01); *H01G 4/1236* (2013.01); *H01G 4/2325* (2013.01); *H01G 4/248* (2013.01)

(58) Field of Classification Search
CPC ...... H01G 4/008; H01G 4/0085; H01G 4/012; H01G 4/12; H01G 4/1227; H01G 4/1236; H01G 4/2325; H01G 4/248; H01G 4/30
See application file for complete search history.

(56) References Cited

U.S. PATENT DOCUMENTS

| | | | |
|---|---|---|---|
| 8,248,752 B2* | 8/2012 | Hur | H01G 4/008 |
| | | | 361/311 |
| 9,530,560 B2* | 12/2016 | Onishi | H01L 41/293 |
| 2012/0127626 A1* | 5/2012 | Chang | H01G 4/012 |
| | | | 361/301.4 |
| 2013/0002388 A1 | 1/2013 | Kim et al. | |
| 2015/0016018 A1 | 1/2015 | Onishi et al. | |

(Continued)

FOREIGN PATENT DOCUMENTS

| | | | |
|---|---|---|---|
| JP | 09260201 A | * | 10/1997 |
| JP | 2002-208533 A | | 7/2002 |
| JP | 2005327999 A | * | 11/2005 |

(Continued)

*Primary Examiner* — Nathan Milakovich
(74) *Attorney, Agent, or Firm* — Keating & Bennett, LLP

(57) ABSTRACT

A multilayer ceramic capacitor includes a laminate including ceramic layers and internal electrode layers laminated together in a lamination direction, and at a widthwise end of at least one of the internal electrode layers in a cross section of the laminate perpendicular to the lamination direction, a ratio of a length X to a length Y is about 1.2 or more and about 3.0 or less, where the length X denotes a length of a straight boundary line between the internal electrode layer and the ceramic layer when the shape of the internal electrode layer is considered as a polygon, and the length Y denotes a length of an actual boundary line between the internal electrode layer and the ceramic layer.

18 Claims, 5 Drawing Sheets

(56) References Cited

U.S. PATENT DOCUMENTS

2015/0116898 A1* 4/2015 Takashima ............... H01G 4/30
361/301.4

FOREIGN PATENT DOCUMENTS

| JP | 2012-230959 A | | 11/2012 |
|----|---------------|---|---------|
| JP | 2013-016770 A | | 1/2013 |
| JP | 2015-035581 A | | 2/2015 |
| JP | 2019-176131 A | | 10/2019 |
| JP | 2021077828 A | * | 5/2021 |

* cited by examiner

MULTILAYER CERAMIC CAPACITOR

CROSS REFERENCE TO RELATED APPLICATIONS

This application claims the benefit of priority to Japanese Patent Application No. 2019-205455 filed on Nov. 13, 2019. The entire contents of this application are hereby incorporated herein by reference.

BACKGROUND OF THE INVENTION

1. Field of the Invention

The present invention relates to a multilayer ceramic capacitor.

2. Description of the Related Art

Electronic devices are used at a higher frequency than before, and multilayer ceramic capacitors used in electronic devices are required to withstand a high frequency range of several GHz or higher.

JP 2013-16770 A discloses a multilayer ceramic capacitor in which the coverage at a central portion of an internal electrode layer is 75% or more, and the coverage at a tapered portion is 80% or less of that of the central portion.

In a multilayer ceramic capacitor used at a high frequency range, the current tends to flow only in surfaces of internal electrode layers due to the skin effect.

When the current flow is restricted to the surfaces of the internal electrode layers, the current is likely to be affected by the conditions of the surfaces of the internal electrode layers or the conditions of boundary regions between the internal electrode layers and the ceramic layers. In such a case, equivalent series resistance per unit electrode layer (hereinafter, referred to as ESR per unit electrode layer) is disadvantageously increased.

The coverage control described in JP 2013-16770 A alone is insufficient to solve the problem. Other techniques to solve the problem have been needed but not yet provided.

SUMMARY OF THE INVENTION

Preferred embodiments of the present invention provide multilayer ceramic capacitors that are each capable of reducing ESR per unit electrode layer at a high frequency range.

A multilayer ceramic capacitor according to a preferred embodiment of the present invention includes a laminate including a plurality of ceramic layers and a plurality of internal electrode layers laminated together in a lamination direction, and includes, at a widthwise end of at least one of the internal electrode layers in a cross section of the laminate perpendicular or substantially perpendicular to the lamination direction, a ratio of a length X to a length Y of about 1.2 or more and about 3.0 or less, with the length X denoting a length of a straight boundary line between the internal electrode layer and the ceramic layer when a shape of the internal electrode layer is considered as a polygon, and the length Y denoting a length of an actual boundary line between the internal electrode layer and the ceramic layer.

Preferred embodiments of the present invention provide multilayer ceramic capacitors that are each capable of reducing ESR per unit electrode layer at a high frequency range.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic capacitors according to preferred embodiments of the present invention are described below with reference to the drawings.

The present invention is not limited to the following preferred embodiments, and may be suitably modified without departing from the gist of the present invention. Combinations of two or more features described in the following preferred embodiments are also within the scope of the present invention.

Figure 1:
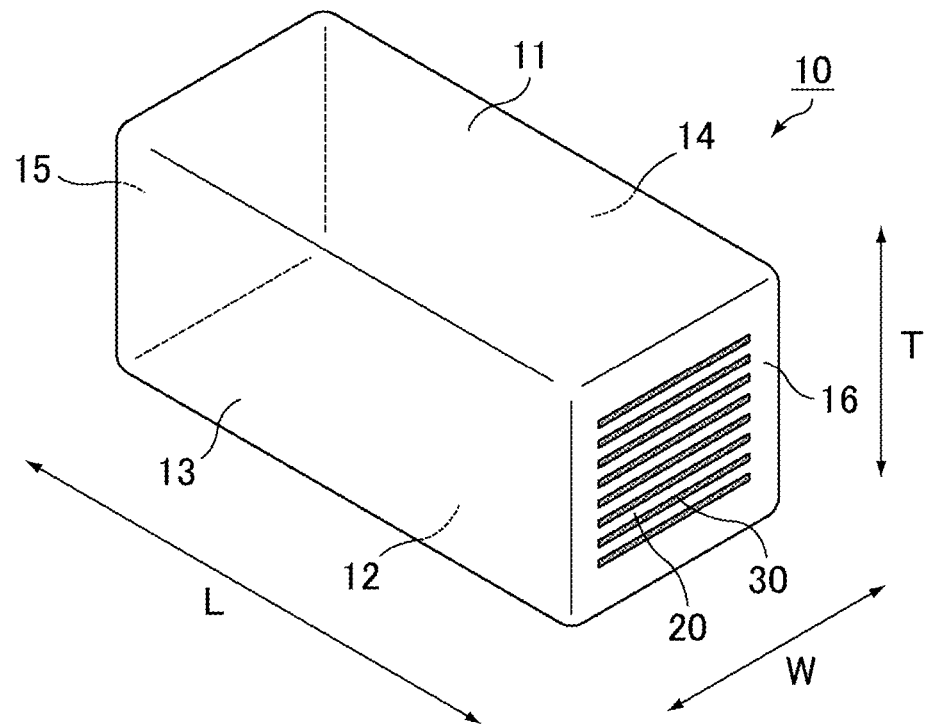
FIG. 1 is a schematic perspective view showing a laminate defining a multilayer ceramic capacitor according to a preferred embodiment of the present invention.
Figure 2:
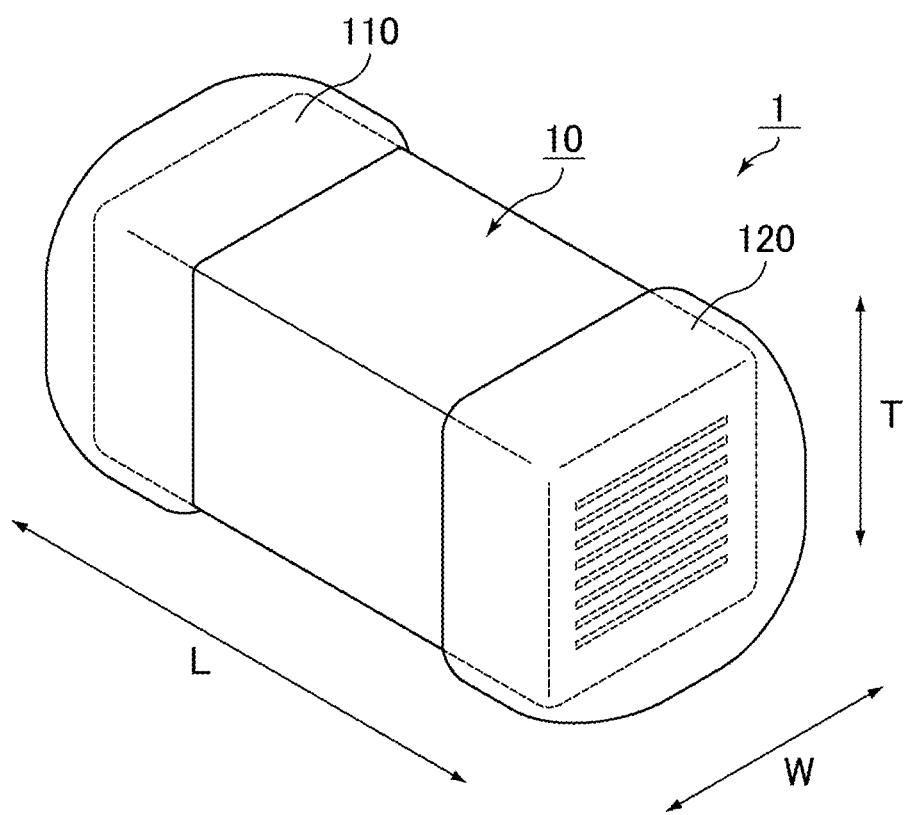
FIG. 2 is a schematic perspective view showing an example of a multilayer ceramic capacitor according to a preferred embodiment of the present invention.

With reference to FIG. 1 and FIG. 2, a laminate and external electrodes defining a multilayer ceramic capacitor according to a preferred embodiment of the present invention are described.

FIG. 1 is a schematic perspective view showing a laminate defining a multilayer ceramic capacitor according to a preferred embodiment of the present invention. FIG. 2 is a schematic perspective view showing an example of a multilayer ceramic capacitor according to a preferred embodiment of the present invention.

The length direction, the width direction, and the lamination direction of the multilayer ceramic capacitor and the laminate are specified by double-headed arrows L, W, and T, respectively, in a laminate 10 shown in FIG. 1 and a multilayer ceramic capacitor 1 shown in FIG. 2. The length direction, the width direction, and the lamination direction are perpendicular or substantially perpendicular to each other. The lamination direction is a direction in which a plurality of ceramic layers 20 and a plurality of internal electrode layers 30 defining the laminate 10 are stacked.

The length direction is a direction in which a first external electrode 110 and a second external electrode 120 of the multilayer ceramic capacitor 1, oppose each other (see FIG. 2).

In the laminate 10 in FIG. 1 and the multilayer ceramic capacitor 1 in FIG. 2, the dimension in the length direction is greater than the dimension in the width direction. However, in the multilayer ceramic capacitor and the laminate according to preferred embodiments of the present invention, the size relationship between the dimension in the length direction and the dimension in the width direction is not limited. The dimension in the length direction may be greater or smaller than the dimension in the width direction.

The laminate 10 has a cuboid or substantially cuboid shape including six surfaces, and includes the plurality of ceramic layers 20 and the plurality of internal electrode layers 30 that are laminated together. The laminate 10 includes a first main surface 11 and a second main surface 12 that oppose each other in the lamination direction T indicated by the double-headed arrow T in FIG. 1, a first side surface 13 and a second side surface 14 that oppose each other in the width direction W indicated by the double-headed arrow W perpendicular or substantially perpendicular to the lamination direction T, and a first end surface 15 and a second end surface 16 that oppose each other in the length direction L indicated by the double-headed arrow L perpendicular or substantially perpendicular to the lamination direction T and the width direction W.

Herein, a cross section of the laminate 10 perpendicular or substantially perpendicular to the first end surface 15 and the second end surface 16 and parallel or substantially parallel to the lamination direction of the laminate 10 is referred to as an "LT cross section". A cross section of the laminate 10 perpendicular or substantially perpendicular to the first side surface 13 and the second side surface 14 and parallel or substantially parallel to the lamination direction of the laminate 10 is referred to as a "WT cross section".

A cross section of the laminate 10 perpendicular or substantially perpendicular to the first side surface 13, the second side surface 14, the first end surface 15, and the second end surface 16 and also perpendicular or substantially perpendicular to the lamination direction of the laminate 10 is referred to as an "LW cross section".

The plurality of internal electrode layers include a first internal electrode layer and a second internal electrode layer that are laminated together. The first internal electrode layer is exposed at the first end surface, and the second internal electrode layer is exposed at the second end surface. Capacitance is generated in an electrode-opposing portion where the first internal electrode layer and the second internal electrode layer oppose each other with a ceramic layer therebetween.

In other words, the laminate includes at least a pair of a first internal electrode layer and a second internal electrode layer and a ceramic layer disposed between the first internal electrode layer and the second internal electrode layer, which define the capacitor.

The shape of a widthwise end of the internal electrode layer in a cross section of the laminate perpendicular or substantially perpendicular to the lamination direction, i.e., the LW cross section of the laminate, is described below.

In the LW cross section of the laminate in the multilayer ceramic capacitor of the present preferred embodiment, a ratio of a length X to a length Y is preferably about 1.2 or more and about 3.0 or less, for example, with the length X denoting a length of a straight boundary line between an internal electrode layer and a ceramic layer when the shape of the internal electrode layer is considered as a polygon, and the length Y denoting a length of an actual boundary line between the internal electrode layer and the ceramic layer.

Figure 3:
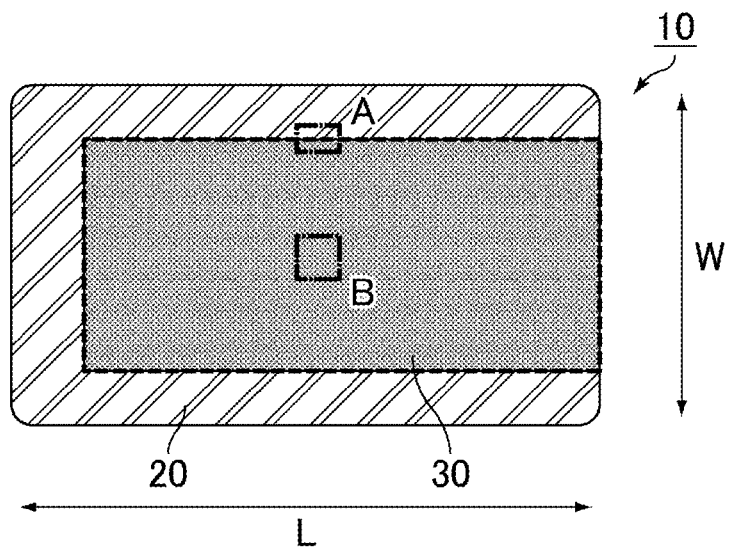
FIG. 3 is a schematic cross-sectional view of an example LW cross section of a laminate according to a preferred embodiment of the present invention.

FIG. 3 is a schematic cross-sectional view of an example LW cross section of the laminate.

The cross section in FIG. 3 is a cross section of the laminate 10 cut at a position including both of the internal electrode layer 30 and the ceramic layer 20. The LW cross section described herein refers to a LW cross section at such a position.

The shape of the internal electrode layer 30 in FIG. 3 may be considered as a rectangle, for example, which is one type of polygon. Dotted lines indicate sides of the internal electrode layer 30 whose shape is considered as a rectangle.

Figure 4:
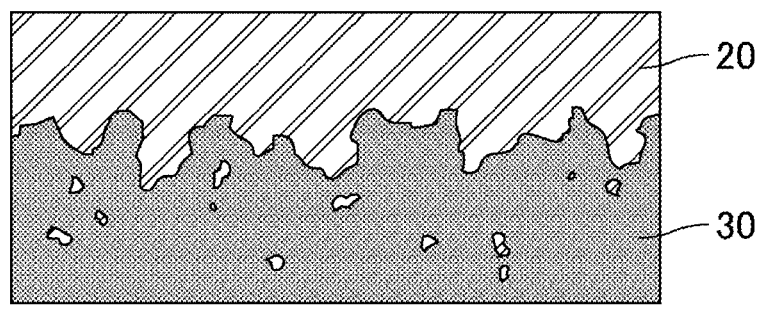
FIG. 4 is an enlarged schematic cross-sectional view of an example of the shape of a widthwise end of an internal electrode layer according to a preferred embodiment of the present invention.

FIG. 4 is an enlarged schematic cross-sectional view of an example of the shape of a widthwise end of an internal electrode layer.

FIG. 4 is an enlarged view of a region A which is a rectangle surrounded by dotted lines in FIG. 3.

FIG. 4 includes a straight line drawn when the shape of the internal electrode layer 30 is considered as rectangle as in FIG. 3. The line is considered as a straight boundary line X between the internal electrode layer 30 and the ceramic layer 20 in the LW cross section of the laminate when the shape of the internal electrode layer 30 is considered as a polygon.

Figure 5:
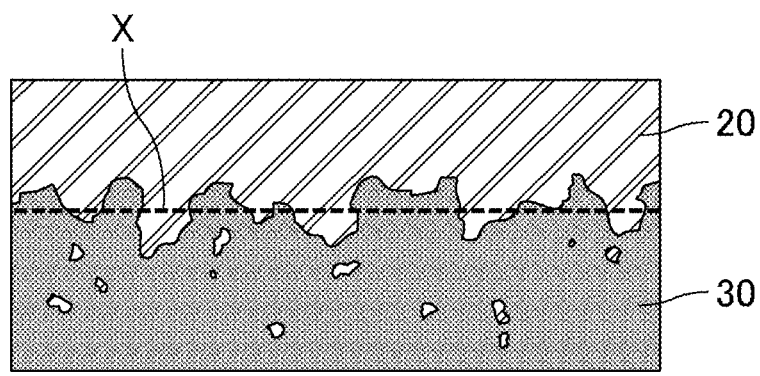
FIG. 5 is the cross-sectional view of FIG. 4 with a straight line X defining the boundary line between the internal electrode layer and a ceramic layer when the shape of the internal electrode layer is considered as a polygon.

FIG. 5 is the cross-sectional view of FIG. 4 with insertion of a straight line X defining the boundary line between the internal electrode layer and a ceramic layer when the shape of the internal electrode layer is considered as a polygon. The length of the straight line X is referred to as length X.

In FIG. 4, an actual boundary line Y between the internal electrode layer 30 and the ceramic layer 20 is drawn. The boundary line Y is drawn based on a cross-sectional image as shown in FIG. 4 and is usually not straight.

Figure 6:
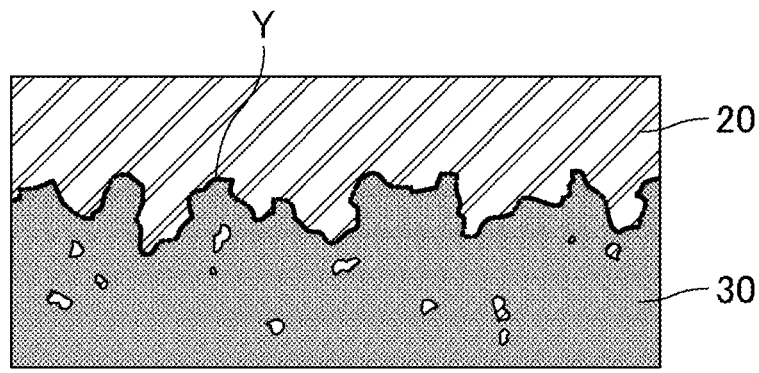
FIG. 6 is the cross-sectional view of FIG. 4 with insertion of an actual boundary line Y between the internal electrode layer and the ceramic layer.

FIG. 6 is the cross-sectional view of FIG. 4 with insertion of an actual boundary line Y between the internal electrode layer and the ceramic layer. The length of the boundary line Y is referred to as length Y.

The length X and the length Y are determined from the same cross-sectional image. Thus, the length Y is longer than the length X, excluding the case where the actual boundary line Y between the internal electrode layer and the ceramic layer is straight. In other words, the ratio of the length X to the length Y is usually about 1.0 or more.

In the ceramic capacitor of the present preferred embodiment, the ratio of the length X to the length Y is preferably about 1.2 or more and about 3.0 or less, for example.

As described above, in a multilayer ceramic capacitor used at a high frequency range, the current flows only in surfaces of internal electrode layers due to the skin effect. Specifically, the current locally flows along the actual boundary line portion between the internal electrode layer and the ceramic layer as shown in FIG. 6. In the case where the length of the portion is long, i.e., the length Y is long, the current flows a long distance to increase the resistance value.

Consequently, ESR per unit electrode layer increases. From this standpoint, the length Y is preferably short.

When the ratio of the length Y to length X is about 3.0 or less, the ESR per unit electrode layer of the multilayer ceramic capacitor used at a high frequency range can be reduced.

When the ratio of the length Y to the length X nears about 1.0, separation between the internal electrode layer and the ceramic layer is likely to occur. Thus, the ratio of the length Y to the length X is preferably about 1.2 or more, for example, to prevent the separation between the internal electrode layer and the ceramic layer.

The position to measure the length X and the length Y in an enlarged view of a widthwise end of the internal electrode layer is the center or the approximate center of the laminate in the length direction, and is in a visual region of an electron microscope image at about 2000× magnification.

The internal electrode layer measurement is taken at or approximately at the center of the laminate in the thickness direction.

In the width direction of a cross section of the laminate perpendicular or substantially perpendicular to the lamination direction, a total of a width of a projection defined by the actual boundary line between the internal electrode and the ceramic layer extending upward from a straight boundary line between the internal electrode layer and the ceramic layer when the shape of the internal electrode layer is considered as a polygon and a width of a recess defined by the actual boundary line extending downward from the straight boundary line is preferably about 5 μm or more and about 11 μm or less, for example.

This configuration can be confirmed from the image of FIG. 4 with insertion of the straight line X shown in FIG. 5 and insertion of the actual boundary line Y shown in FIG. 6.

Figure 7:
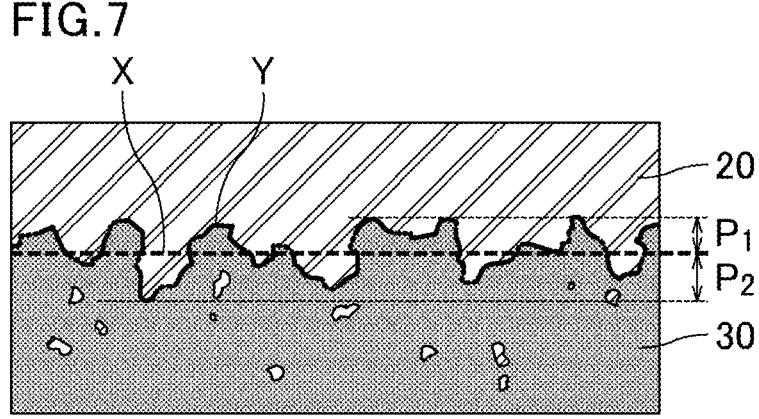
FIG. 7 is the cross-sectional view of FIG. 4 with insertion of a straight line X defining the boundary line between the internal electrode layer and the ceramic layer when the shape of the internal electrode layer is considered as a polygon and insertion of an actual boundary line Y between the internal electrode layer and the ceramic layer.

FIG. 7 is the cross-sectional view of FIG. 4 with insertion of the straight line X defining the boundary line between the internal electrode layer and the ceramic layer when the shape of the internal electrode layer is considered as a polygon and insertion of the actual boundary line Y between the internal electrode layer and the ceramic layer.

In FIG. 7, the portions which are defined by the actual boundary line Y and extend upward from the straight line X are referred to as projections, and the portions which are defined by the boundary line Y and extend downward from the straight line X are referred to as recesses. A width of a projection upwardly extending the most from the straight line X among the projections is referred to as a width of projections. A width of a recess downwardly extending the most from the straight line X among the recesses is referred to as a width of recesses. A total of the width of projections and the width of recesses is calculated. The total is preferably about 5 μm or more and about 11 μm or less, for example.

In FIG. 7, the width of projections is indicated by a double-headed arrow $P_1$, and the width of recesses is indicated by a double-headed arrow $P_2$.

The total of the widths is preferably about 5 μm or more and about 11 μm or less, for example. When the total is less than about 5 μm, separation between layers is likely to occur in the laminate. When the total is more than about 11 μm, the internal electrode layers are likely to be exposed to a surface of the laminate.

Note that the total is preferably about 5 μm or more and about 11 μm or less only when the ratio of the length Y to the length X is about 1.2 or more and about 3.0 or less.

The internal electrode layer preferably has an area coverage ratio of about 87% or more and about 95% or less, for example, at a central region of a polygon when the shape of the internal electrode layer is considered as a polygon.

The central region at which the area coverage ratio is measured is indicated by a square region B schematically shown in FIG. 3.

The area coverage ratio is measured as follows: dielectric layers in the laminate are separated from each other to expose an internal electrode layer; the exposed internal electrode layer is photographed by an electron microscope at about 2000× magnification to obtain an image including the region B in a predetermined visual region; and a ratio of the area where the internal electrode layer is present to the area of the entire visual region is calculated as an area coverage ratio.

When the area coverage ratio is more than about 95%, separation between the internal electrode layer and the ceramic layer is likely to occur.

When the area coverage ratio is less than about 87%, the capacitance to be obtained is small. Therefore, the area coverage ratio is preferably about 87% or more and about 95% or less, for example.

Preferred structures of the laminate, ceramic layers, internal electrode layers, and external electrode layers are described below.

The laminate is preferably rounded at its corners and ridges. A corner is a portion where three faces of the laminate meet. A ridge is a portion where two faces of the laminate meet.

The laminate preferably has a 0402 size.

In this case, the laminate preferably has a length of about 0.38 mm or more and about 0.42 mm or less in the length direction, a length of about 0.18 mm or more and about 0.22 mm or less in the width direction, and a length of about 0.18 mm or more and about 0.22 mm or less in the lamination direction, for example.

The lengths of a multilayer ceramic capacitor in the length direction, width direction, and lamination direction are also preferably within the ranges indicated above.

The laminate preferably has a 0201 size.

In this case, the laminate preferably has a length of about 0.15 mm or more and about 0.30 mm or less in the length direction, a length of about 0.08 mm or more and about 0.15 mm or less in the width direction, and a length of about 0.08 mm or more and about 0.15 mm or less in the lamination direction, for example.

The lengths of a multilayer ceramic capacitor in the length direction, width direction, and lamination direction are also preferably within the ranges indicated above.

The number of the ceramic layers is preferably 10 or more and 600 or less, and more preferably 20 or more and 600 or less, for example. The number of ceramic layers does not include the number of ceramic layers which are not present between the internal electrode layers.

The thickness of each of the ceramic layers which are present between the internal electrode layers is preferably about 0.4 μm or more and about 50 μm or less, for example.

Each dimension of the laminate as described above can be measured by a micrometer. The number of the ceramic layers can be counted with an optical microscope.

Each ceramic layer may preferably include, for example, a perovskite compound, typically barium titanate ($BaTiO_3$), represented by a general formula $AmBO_3$ wherein A site is Ba and may include, in addition to Ba, at least one selected from the group consisting of Sr and Ca; B site is Ti and may include, in addition to Ti, at least one selected from the group consisting of Zr and Hf; O is oxygen; and m is a mole ratio of the A site to the B site. Alternatively, each ceramic layer may include a ceramic material including, as a main component, calcium titanate ($CaTiO_3$), strontium titanate ($SrTiO_3$), calcium zirconate ($CaZrO_3$), titanium oxide ($TiO_2$), or the like, for example.

Among these, calcium zirconate is preferably included.

The multilayer ceramic capacitor including calcium zirconate can be suitably used as a temperature compensation capacitor.

Each ceramic layer may include, as a sub-component whose content is lower than that of the main component, Mn, Mg, Si, Co, Ni, V, Al, a rare earth element, or the like, for example.

Each internal electrode layer preferably includes a metal material such as nickel, copper, silver, palladium, a silver-palladium alloy, or gold, for example. The internal electrode layer preferably includes a ceramic material having the same or similar composition as that of a ceramic material contained in the ceramic layers.

The internal electrode layer more preferably includes copper or silver, and still more preferably includes copper, for example.

The number of the internal electrode layer is preferably 2 or more and 600 or less, and more preferably 10 or more and 600 or less, for example. The average thickness of each internal electrode layer is preferably about 0.3 µm or more and about 3.0 µm or less, for example.

Each external electrode preferably includes a metal and glass.

The metal included in the external electrode is preferably at least one metal selected from the group consisting of copper, nickel, silver, palladium, a silver-palladium alloy, and gold, more preferably copper, for example. In addition to copper, the external electrode may include an oxide of at least one metal selected from zirconium, aluminum, titanium, silicon, and the like, for example.

The glass included in the external electrode may be B—Si glass, Ba—B—Si glass, B—Si—Zn glass, B—Si—Zn—Ba glass, B—Si—Zn—Ba—Ca—Al glass, or the like, for example.

The volume percentage of the glass in the external electrode is preferably about 29% or less, for example.

When the volume percentage of the glass is about 29% or less, due to the small percentage of the glass, the external electrode can have a low resistance value.

Additionally, when the volume percentage of the glass is about 29% or less, glass deposition is less likely to occur, increasing the adhesion of plating upon providing a plating layer on the external electrode.

The volume percentage of the glass in the external electrode is preferably about 20% or more, for example.

When the volume percentage of the glass is about 20% or more, the external electrode can have a high density.

When the external electrode has a high density, entering of a plating liquid and moisture into the external electrode or entering of a plating liquid and moisture into the laminate through the external electrode can be reduced or prevented.

Taking the above into consideration, the volume percentage of the glass in the external electrode is adjusted to about 20% or more and about 29% or less. Thus, a multilayer ceramic capacitor including external electrodes that have preferred features from the standpoint of the resistance value of the external electrodes and the density of the external electrodes can be obtained.

In the multilayer ceramic capacitor of the present preferred embodiment, a ratio of a volume percentage $Z_1$ of the glass at a surface of the external electrode, a volume percentage $Z_2$ of the glass at a center of the external electrode, and a volume percentage $Z_3$ of the glass at a portion of the external electrode adjacent to the laminate, $Z_1:Z_2:Z_3$, is preferably 0.7-0.9:1:0.7-0.9.

The surface of the external electrode, the center or approximate center of the external electrode, and the portion of the external electrode adjacent to the laminate refer to the regions defined by dividing the external electrode into three in the thickness direction (length direction of the laminate) of the external electrode in the LW cross section.

The site of the division into three is preferably at or approximately at the center of the laminate in the width direction.

Preferably, the surface of the external electrode has a relatively small volume percentage $Z_1$ of the glass. A small volume percentage of the glass at the surface of the external electrode indicates no glass deposition. In this case, the adhesion of plating upon providing a plating layer on the external electrode is increased.

Preferably, the portion of the external electrode adjacent to the laminate has a relatively large volume percentage $Z_3$ of the glass. When the volume percentage of the glass is large at a portion where the external electrode and the laminate meet, the external electrode is firmly attached to the laminate.

The volume percentage of the glass in the external electrode can be measured by capturing an electron microscope photograph of a LW cross section including a portion of the external electrode, and performing EDX elemental analysis of the portion. The elemental analysis focuses on elements included only in glass among the components of the external electrode.

Determination of each of the volume percentages $Z_1$, $Z_2$, and $Z_3$ may be performed by EDX elemental analysis of only each of the regions as a measurement region.

The external electrode preferably includes a plating layer thereon.

The plating layer preferably includes at least one metal selected from the group consisting of copper, nickel, tin, palladium, gold, silver, platinum, bismuth, and zinc, for example. The number of the plating layer may be one, or two or more. The plating layer more preferably includes a nickel plating layer on the external electrode and a tin plating layer, for example.

The nickel plating layer prevents water from entering the laminate, and the tin plating layer improves the mountability of the multilayer ceramic capacitor.

The multilayer ceramic capacitor of the present preferred embodiment is preferably used at a high frequency range. For example, it is preferably used at a frequency range of about 800 MHz or higher, and more preferably at a frequency range of about 1 GHz or higher.

The multilayer ceramic capacitor of the present preferred embodiment can be produced, for example, as described below.

A binder, a solvent, and the like are added to a ceramic powder to prepare a slurry. The slurry is formed into a sheet by the doctor blading method, for example. The sheet is cut to prepare a ceramic green sheet of a predetermined size.

A conductive paste for internal electrode layers is prepared.

The conductive paste includes a metal material such as copper, an additive, a solvent, a dispersant, and a binder, for example.

The shape of a widthwise end of the internal electrode layer can be controlled by varying the proportion of the additive, and thus the ratio of the length Y to the length X can be adjusted to about 1.2 or more and about 3.0 or less.

For example, the amount of the additive in the conductive paste is preferably adjusted to about 4.0% by weight or more, for example, by using a ceramic dielectric material such as, for example, calcium zirconate as an additive.

The conductive paste for internal electrode layers is printed in a predetermined pattern on the ceramic green sheet by, for example, screen printing or gravure printing, thus forming an internal electrode pattern.

A multilayer sheet is produced by stacking a predetermined number of ceramic green sheets on each of which no internal electrode pattern is printed, stacking thereon a predetermined number of ceramic green sheets on each of which the internal electrode pattern is printed, and stacking thereon a predetermined number of ceramic green sheets on each of which no internal electrode pattern is printed.

The multilayer sheet is pressed by, for example, isostatic press in the lamination direction to produce a multilayer block.

The multilayer block is cut out in a predetermined size to produce a multilayer chip. The corners and ridges of each multilayer chip may be rounded by barrel polish, for example.

The multilayer chip is subjected to firing to produce a laminate.

In the case of using a paste mainly including copper as the conductive paste for internal electrode layers, the firing temperature is preferably about 850° C. or higher and about 1050° C. or lower, for example.

In the case of using a paste mainly including nickel as the conductive paste for internal electrode layers, the firing temperature is preferably about 1100° C. or higher and about 1300° C. or lower, for example.

Subsequently, an external electrode is formed on an end surface of the laminate from which the internal electrode layers are led out.

The end surface of the laminate may be barrel-polished to make sure that the internal electrode layers are led out from the laminate.

A conductive paste to be made into a baked electrode for providing the external electrode is produced. The conductive paste is produced by, for example, mixing metal particles such as copper particles, a glass frit, resin (e.g., acrylic resin, cellulosic resin, butyral resin), a solvent (e.g., terpineol), or the like, for example.

The volume percentage of the glass frit relative to the total amount of the metal particles and the glass frit in the conductive paste is preferably about 29% or less, for example.

The volume percentage of the glass frit relative to the total amount of the metal particles and the glass frit in the conductive paste is preferably about 20% or more, for example.

The conductive paste is applied to both end surfaces of the laminate and baked to provide external electrodes made of the baked electrode. The baking temperature is preferably about 700° C. or higher and about 900° C. or lower, for example. The baking is preferably performed in a non-oxidative atmosphere.

Preferably, surfaces of the external electrodes made of the baked electrodes are subjected to metal plating to have plating layers.

A multilayer ceramic capacitor can be produced through the above-mentioned steps.

EXAMPLES

Examples that more specifically disclose the multilayer ceramic capacitors according to preferred embodiments of the present invention are described below. The present invention is not limited to these examples.

Example 1

Production of Laminate

A polyvinyl butyral binder, a plasticizer, and ethanol as an organic solvent were added to $CaZrO_3$ as a ceramic material, and they were wet-mixed in a ball mill to produce a ceramic slurry. The ceramic slurry was formed into a sheet by a lip method to obtain a ceramic green sheet in a rectangular shape.

A conductive paste including copper was screen-printed on the ceramic green sheet to form an internal electrode pattern mainly containing copper.

The conductive paste included about 50% by weight of copper powder and about 4% by weight of calcium zirconate as an additive, and also included a solvent, a dispersant, and a binder.

A plurality of the ceramic green sheets each including the internal electrode pattern were stacked such that the sides from which the internal electrode layers were led out alternated with each other. Thus, a raw multilayer sheet to define a capacitor body was obtained. The raw multilayer sheet was pressure-molded and divided by dicing to obtain chips. The chips were heated at about 900° C. in a $N_2$ atmosphere to burn the binder. Subsequently, the chips were subjected to firing in a reducing atmosphere including $H_2$, $N_2$, and $H_2O$ gases. Thus, a sintered laminate was obtained. The laminate has a structure including a plurality of ceramic layers and a plurality of internal electrode layers. The dimensions of the laminate were as follows: about 0.22 mm in the length direction×about 0.11 mm in the width direction×about 0.11 mm in the lamination direction.

Formation of External Electrode

The conductive paste to form baked electrodes was produced.

Specifications of the conductive paste was as follows:

Solids content: about 25 vol % (the remaining about 75 vol % consists of acrylic resin and terpineol)

Percentage of copper powder in solids content: about 74 vol %

Percentage of glass frit in solids content: about 26 vol %

The conductive paste was applied to end surfaces of the laminate and dried. The workpiece was subjected to firing at a top temperature of about 800° C. in a non-oxidative atmosphere to form external electrode made of baked electrodes. Next, a nickel plating layer was provided on each external electrode by barrel plating, and subsequently a tin plating layer was provided thereon in the same manner, thereby producing a multilayer ceramic capacitor.

In the multilayer ceramic capacitor produced in Example 1, the plating layer was well adhered to the external electrodes, and the external electrodes had a high density.

Comparative Example 1

A multilayer ceramic capacitor was produced as in Example 1, except that the composition of the conductive paste used to form an internal electrode pattern was changed to a general paste additionally including a solvent, a dispersant, and a binder.

Comparative Example 2

A multilayer ceramic capacitor was produced as in Example 1, except that the composition of the conductive paste used to form an internal electrode pattern was changed to another general paste additionally including a solvent, a dispersant, and a binder.

Observation of LW Cross Section of Laminate

Cross sections of the multilayer ceramic capacitors produced in the example and the comparative examples were each ground so that a LW cross section as shown in FIG. 3 was exposed. A cross-sectional photograph of a widthwise end of the internal electrode layer as shown in FIG. 4 was taken at about 2000× magnification.

In the visual region of the cross-sectional photograph, a straight boundary line between the internal electrode layer and the ceramic layer when the shape of the internal electrode layer was considered as a polygon was drawn, and a length X was measured. A length Y which was the length of an actual boundary line between the internal electrode layer and the ceramic layer was also measured.

Figure 8:
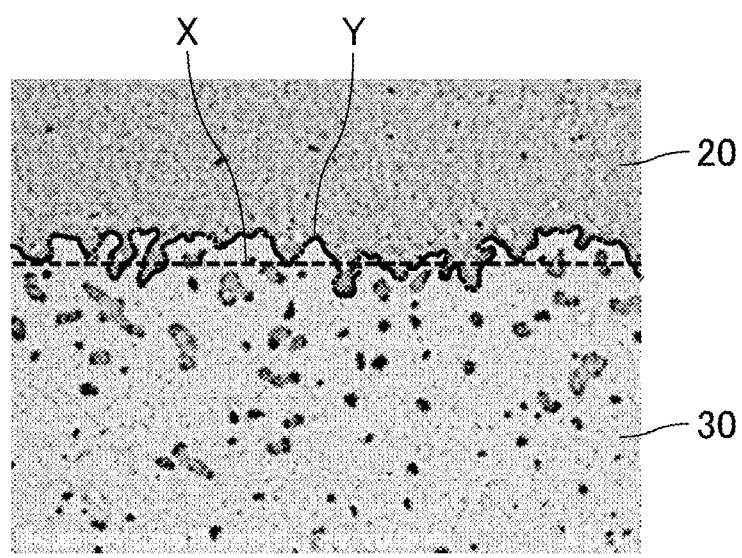
FIG. 8 is a cross-sectional photograph of the shape of a widthwise end of an internal electrode layer in a multilayer ceramic capacitor of Example 1.

FIG. 8 is a cross-sectional photograph of the shape of a widthwise end of an internal electrode layer in a multilayer ceramic capacitor of Example 1.

Figure 9:
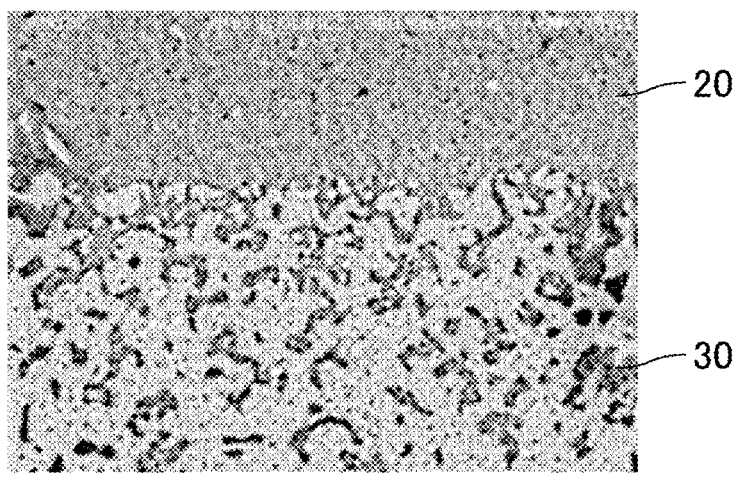
FIG. 9 is a cross-sectional photograph of the shape of a widthwise end of an internal electrode layer in a multilayer ceramic capacitor of Comparative Example 1.

FIG. 9 is a cross-sectional photograph of the shape of a widthwise end of an internal electrode layer in a multilayer ceramic capacitor of Comparative Example 1.

Both the straight line X to measure the length X and the boundary line Y to measure the length Y are drawn in FIG. 8 and FIG. 9.

The ratio (Y/X) of the length Y to the length X were as follows:

Example 1: about 2.3
Comparative Example 1: about 3.9
Comparative Example 2: about 3.2

Measurement of Width of Projections and Width of Recesses

From the cross-sectional photograph taken in the above Observation of LW cross section of Laminate, a total of a width $P_1$ and a width $P_2$ was calculated. The width $P_1$ is the width of a projection defined by an actual boundary line between the internal electrode layer and the ceramic layer extending upward from a straight boundary line between the internal electrode layer and the ceramic layer. The width $P_2$ is the width of a recess defined by the actual boundary line extending downward from the straight boundary line. The results were as follows:

Example 1: about 9 μm
Comparative Example 1: about 10 μm
Comparative Example 2: about 11 μm Determination of Area Coverage Ratio According to the method described earlier, an electron microscopic image at about 2000× magnification including the region B in the visual region shown in FIG. 3 was analyzed. A ratio of the area where the internal electrode layer was present to the area of the entire visual region was calculated as an area coverage ratio.

Figure 10:
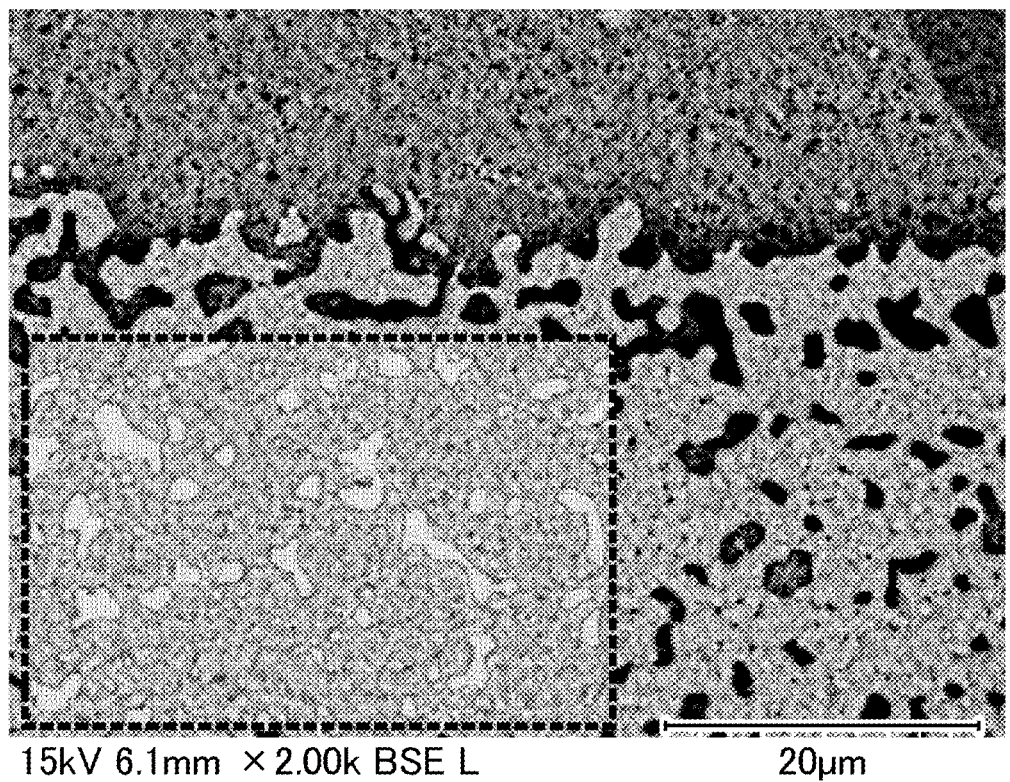
FIG. 10 is an electron microscope image for determining an area coverage ratio in Example 1 of a preferred embodiment of the present invention.

FIG. 10 is an electron microscope image for determining an area coverage ratio in Example 1. The region surrounded by the dotted line is a region B for determining the area coverage ratio.

The results were as follows:
Example 1: about 90%
Comparative Example 1: about 77%
Comparative Example 2: about 86%

Measurement of ESR

Ten multilayer ceramic capacitors were prepared in each of the example and the comparative examples. The ESR value of each multilayer ceramic capacitor was measured using an impedance analyzer (Agilent Technologies, E4991B), and the ESR value was divided by the number of the internal electrode layers to determine ESR per unit electrode layer. An average of the ESRs per unit electrode layer of the ten capacitors was calculated. The measurement conditions were about 1 GHz and about 1 Vrms.

Figure 11:
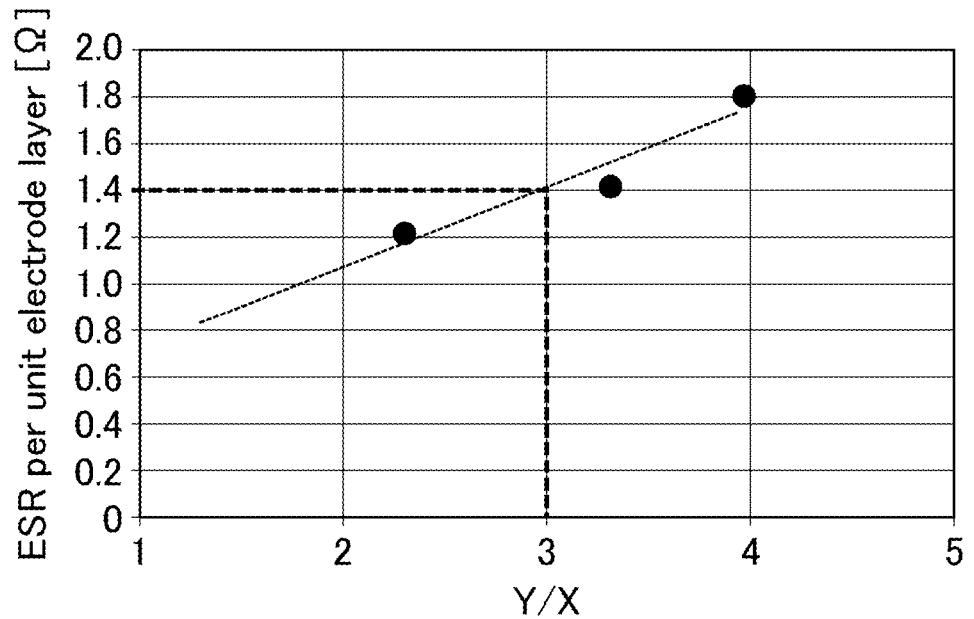
FIG. 11 is a graph showing a relationship between a ratio (Y/X) of the length Y to the length X and ESR per unit electrode layer.

FIG. 11 is a graph showing a relationship between a ratio (Y/X) of the length Y to the length X and ESR per unit electrode layer.

As shown in FIG. 11, a judgment value to determine that the ESR per unit electrode layer was preferred was set to about 1.4, provided that the multilayer ceramic capacitor was used at a high frequency range.

The relationship between the Y/X ratio and the ESR per unit electrode layer was plotted, and a straight line was drawn based on the plots. A preferred range is the range where the straight line is below the judgement value of the ESR per unit electrode layer. It is thus demonstrated that the Y/X ratio is preferably about 3.0 or less.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:
a laminate including a plurality of ceramic layers and a plurality of internal electrode layers laminated together in a lamination direction; wherein
at a widthwise end of at least one of the plurality of internal electrode layers in a cross section of the laminate perpendicular or substantially perpendicular to the lamination direction, a ratio of a length X to a length Y is about 1.2 or more and about 3.0 or less, where the length X denotes a length of a straight boundary line between the at least one internal electrode layer and a ceramic layer of the plurality of ceramic layers when the shape of the at least one internal electrode layer is considered as a polygon, and the length Y denotes a length of an actual boundary line between the at least one internal electrode layer and the ceramic layer; and
the actual boundary includes at least one projection that is asymmetrical about an axis that extends through the at least one projection in a direction that is perpendicular to the straight boundary line.

2. The multilayer ceramic capacitor according to claim 1, wherein at a central region of the polygon when the shape of the at least one internal electrode layer is considered as a polygon, the at least one internal electrode layer has an area coverage ratio of about 87% or more and about 95% or less.

3. The multilayer ceramic capacitor according to claim 1, wherein, at the widthwise end of the at least one of the internal electrode layers in the cross section of the laminate perpendicular or substantially perpendicular to the lamination direction, a total of a width of a projection defined by the actual boundary line between the internal electrode and the ceramic layer extending upward from the straight boundary line between the internal electrode layer and the ceramic layer when the shape of the internal electrode layer is considered as a polygon and a width of a recess defined by the actual boundary line extending downward from the straight boundary line is about 5 μm or more and about 11 μm or less.

4. The multilayer ceramic capacitor according to claim 1, wherein the plurality of internal electrode layers include copper.

5. The multilayer ceramic capacitor according to claim 1, wherein the plurality of ceramic layers include calcium zirconate.

6. The multilayer ceramic capacitor according to claim 1, wherein
the laminate includes an external electrode on an end surface thereof;
the external electrode includes a metal and glass; and
a volume percentage of the glass in the external electrode is about 29% or less.

7. The multilayer ceramic capacitor according to claim 6, wherein the metal included in the external electrode is copper.

8. The multilayer ceramic capacitor according to claim 6, wherein the volume percentage of the glass in the external electrode is about 20% or more.

9. The multilayer ceramic capacitor according to claim 6, wherein a ratio of a volume percentage $Z_1$ of the glass at a surface of the external electrode, a volume percentage $Z_2$ of the glass at a center or approximate center of the external electrode, and a volume percentage $Z_3$ of the glass at a portion of the external electrode adjacent to the laminate, $Z_1:Z_2:Z_3$, is 0.7-0.9:1:0.7-0.9.

10. The multilayer ceramic capacitor according to claim 1, wherein
the laminate includes an external electrode on each of opposed end surfaces thereof;
each of the external electrodes includes a metal and glass; and
a volume percentage of the glass in each of the external electrodes is about 29% or less.

11. The multilayer ceramic capacitor according to claim 10, wherein the metal included in each of the external electrodes is copper.

12. The multilayer ceramic capacitor according to claim 10, wherein the volume percentage of the glass in each of the external electrodes is about 20% or more.

13. The multilayer ceramic capacitor according to claim 10, wherein a ratio of a volume percentage $Z_1$ of the glass at a surface of each of the external electrodes, a volume percentage $Z_2$ of the glass at a center or approximate center of each of the external electrodes, and a volume percentage $Z_3$ of the glass at a portion of each of the external electrodes adjacent to the laminate, $Z_1:Z_2:Z_3$, is 0.7-0.9:1:0.7-0.9.

14. The multilayer ceramic capacitor according to claim 1, wherein the laminate includes rounded corners and ridges.

15. The multilayer ceramic capacitor according to claim 1, wherein the laminate has a dimension of about 0.38 mm or more and about 0.42 mm or less in a length direction of the laminate, a dimension of about 0.18 mm or more and about 0.22 mm or less in a width direction of the laminate, and a dimension of about 0.18 mm or more and about 0.22 mm or less in the lamination direction.

16. The multilayer ceramic capacitor according to claim 1, wherein the laminate has a dimension of about 0.15 mm or more and about 0.30 mm or less in a length direction of the laminate, a dimension of about 0.08 mm or more and about 0.15 mm or less in a width direction of the laminate, and a dimension of about 0.08 mm or more and about 0.15 mm or less in the lamination direction.

17. The multilayer ceramic capacitor according to claim 1, wherein a thickness of each of the plurality of ceramic layers is about 0.4 μm or more and about 50 μm or less.

18. The multilayer ceramic capacitor according to claim 1, wherein each of the plurality of ceramic layers includes barium titanate.

* * * * *